US006493987B1

(12) United States Patent
Aesch, Jr. et al.

(10) Patent No.: US 6,493,987 B1
(45) Date of Patent: Dec. 17, 2002

(54) PESTICIDE DELIVERY AND DISPENSING SYSTEM

(76) Inventors: Harold W. Aesch, Jr., 915 E. Fork Dr., Phoenix, AZ (US) 85048; Kenneth R. Chitwood, 130 Shomate Dr., Longwood, FL (US) 32750

( * ) Notice: Subject to any disclaimer, the term of this patent is extended or adjusted under 35 U.S.C. 154(b) by 0 days.

(21) Appl. No.: 09/912,912

(22) Filed: Jul. 25, 2001

(51) Int. Cl.$^7$ ............................................. A01M 7/00
(52) U.S. Cl. ........................................ 43/124; 43/132.1
(58) Field of Search ........................ 43/124, 127, 132.1; 248/49, 75; 239/207–210, 267–269; 169/116

(56) References Cited

U.S. PATENT DOCUMENTS

| | | | |
|---|---|---|---|
| 3,209,485 A | * 10/1965 | Griffin | 43/124 |
| 3,826,454 A | * 7/1974 | Zieger | 248/274.1 |
| 4,033,535 A | * 7/1977 | Moran | 174/153 G |
| 4,056,252 A | * 11/1977 | Simon | 174/153 G |
| 4,304,425 A | * 12/1981 | Ikeda | 277/626 |
| 4,893,434 A | 1/1990 | Knipp et al. | |
| 4,944,110 A | 7/1990 | Sims | |
| 5,184,418 A | * 2/1993 | Fletscher | 43/124 |
| 5,231,796 A | 8/1993 | Sims | |
| 5,347,749 A | * 9/1994 | Chitwood et al. | 43/124 |
| 5,361,533 A | * 11/1994 | Pepper | 43/124 |
| 5,557,078 A | * 9/1996 | Holwerda | 181/208 |
| 6,073,890 A | * 6/2000 | Daoud | 174/153 G |
| 6,349,888 B1 | * 2/2002 | Au et al. | 239/207 |

\* cited by examiner

*Primary Examiner*—Peter M. Poon
*Assistant Examiner*—Susan Piascik
(74) *Attorney, Agent, or Firm*—John D. Lister

(57) ABSTRACT

A pesticide delivery system includes a service box and a plurality of tubular delivery and dispensing lines for carrying a pesticide from the service box to locations in a building structure and dispensing the pesticide in those locations to control and exterminate pests. The service box includes a plate with holes through which elastic end portions of the tubular delivery and dispensing lines pass. Each of the holes has a conical frustum shaped portion and an annular edge portion that has the smallest diameter of the hole and is less in diameter than an outside diameter, in an unstressed or unstretched state, of the elastic end portion of the tubular delivery and dispensing line passing through the hole whereby the annular edge portion of the hole grips and locks the tubular delivery and dispensing line in place.

9 Claims, 2 Drawing Sheets

PESTICIDE DELIVERY AND DISPENSING SYSTEM

BACKGROUND OF THE INVENTION

The present invention relates to a pesticide delivery and dispensing system for use in connection with building structures to control and exterminate pests and, in particular, to a pesticide delivery and dispensing system which includes a simplified, inexpensive, easy to install, service box for introducing gaseous or liquid pesticides into a pesticide delivery and dispensing system, such as but not limited to a pesticide delivery and dispensing system for the control and extermination of roaches, ants, termites and other such pests. As used herein the term "pesticides" includes insecticides, termiticides and other such toxic substances used to control or exterminate roaches, ants, termites and other such pests.

Pesticide delivery and dispensing systems are frequently included in building structures to control and exterminate pests, such as but not limited to roaches, ants, and termites. These pesticide delivery and dispensing systems typically include a plurality of flexible pesticide delivery and dispensing tubes which pass from a common location, e.g. a common location on an outside wall of a building, into predetermined zones of a building where the pesticide is dispensed to control and exterminate pests. The portions of the flexible pesticide delivery and dispensing tubes, leading from the one common location to the various zones of a building, have solid tubular walls to convey the pesticide to the various zones of the building structure where pest control and extermination is desired. In the various zones of the building structure, the pesticide delivery and dispensing tubes typically have a plurality of openings strategically located to dispense the gas or liquid pesticide into the areas where pest control and extermination is required. For example, the pesticide delivery and dispensing tubes may lead from a common location to numerous zones throughout a building structure where pests would normally initially enter a building from the outside and to numerous zones within the walls of the building structure where pests would normally breed and live. In these numerous zones, the gas or liquid pesticide is dispensed from the pesticide delivery and dispensing tubes through holes in the pesticide delivery and dispensing tubes to control or prevent roaches, ants, termites and other such pests from entering a building through these zones of potential entry and/or from breeding and living within the building structure.

Boxes housing ends of the pesticide delivery and dispensing tubes have been used with these pest control and exterminating systems to hold ends of the delivery and dispensing tubes together in one or more location to facilitate the introduction of pesticides into these systems. For example, U.S. Pat. No. 4,893,434, issued Jan. 16, 1990, discloses a "control distribution box" which may be mounted to the sidewall of a building. The control distribution box 15 has a plurality of flexible tubes running from the box to numerous zones in a building where the pesticide is to be dispensed. Snap fasteners 31 are used to hold ends of the tubes in place in a panel 28. In another example, U.S. Pat. Nos. 4,944,110, issued Jul. 31, 1990, and U.S. Pat. No. 5,231,796, issued Aug. 3, 1993, disclose a receptacle for receiving the ends of a plurality of flexible tubes running from the receptacle to numerous zones in a building where a pesticide is to be dispensed. Serrated anchors 28, cable bushings 29 and lengths of drip irrigation tubing 32 are used to secure the ends 27 of the tubes to a plate of the receptacle.

While the above discussed systems provide assemblies for introducing pesticides into pesticide control and extermination systems, the present invention provides a new, simplified and improved service box for introducing pesticides into pest control and extermination systems which is inexpensive, quick and easy to install, and quick and easy to repair.

SUMMARY OF THE INVENTION

The pesticide delivery and dispensing system of the present invention for controlling and exterminating pests includes a service box and a plurality of flexible, tubular delivery and dispensing lines for carrying a gaseous or liquid pesticide from the service box to locations where the pesticide is dispensed to control and exterminate pests. The service box includes a plate with a plurality of holes for retaining the elastic end portions of the plurality of tubular delivery and dispensing lines (as used herein the term "elastic" means "capable of recovering size and shape after deformation"). Each of the holes has a conical frustum shaped portion and an annular edge portion. The annular edge portion of each of the holes has the smallest diameter of the hole. When the elastic end portion of the tubular delivery and dispensing line passing through a hole of the plate is in an unstressed state, the annular edge portion of the hole is less in diameter than an outside diameter of the elastic end portion of the tubular delivery and dispensing line passing through the hole whereby the annular edge of the hole grips the outer surface of the elastic end portion of the tubular delivery and dispensing line and retains the tubular delivery and dispensing line in place so that pesticide, to be dispensed by the system, may be introduced into an open end of the tubular delivery and dispensing line.

During the assembly of the service box, the conical frustum shaped portion of each hole both guides and aligns the elastic end portion of the tubular delivery and dispensing line being passed through the hole with the annular edge portion of the hole so that the tip of the end portion of the delivery and dispensing line can be easily and quickly forced or pushed through the hole. Preferably, once the tip of the elastic end portion of a tubular delivery and dispensing line has been passed through a hole in the service box plate, the elastic end portion of the tubular delivery and dispensing line is placed under tension (tensile stress) to stretch or elongate the elastic end portion of the tubular delivery and dispensing line and reduce the diameter of the elastic end portion of the tubular delivery and dispensing line to a diameter about equal to and preferably, less than the internal diameter of the annular portion of the hole. This reduction in the diameter of the elastic end portion of the tubular delivery and dispensing line enables the elastic end portion of the tubular delivery and dispensing line to be easily drawn further through the hole a desired distance to form a coupling into which a pesticide injection nozzle from a pesticide supply source can be inserted to introduce a gas or liquid pesticide into the tubular delivery and dispensing line. Once the tension or tensile stress on the tubular delivery and dispensing line is released, the elasticity of the end portion of the tubular delivery and dispensing line causes the end portion of the tubular delivery and dispensing line to resume its normal outside diameter on both sides of the annular edge portion of the hole, which is greater than the internal diameter of the annular edge portion of the hole, to lock the end portion of the tubular delivery and dispensing line in place.

Preferably, when a tubular delivery and dispensing line is mounted in the plate, an excess length of the elastic end portion of the tubular delivery and dispensing line is retained behind the plate. If the coupling portion of the tubular delivery and dispensing line passing through one of the holes becomes damaged, e.g. by improper or repeated insertion of the pesticide injection nozzle, at least part of the excess length of the elastic end portion of the tubular delivery and dispensing line can be drawn through the hole to replace the damaged coupling by reducing the diameter of the elastic end portion as it passes through the hole through compressive stress exerted on the elastic end portion of the line by the hole and/or through tensile stress exerted on the elastic end portion of the line that both elongates and reduces the diameter of the elastic end portion. Once the desired length of the excess length of the tubular delivery and dispensing line has been drawn through the plate to form a new coupling portion and any tensile stress elongating the elastic end portion has been released, the elasticity of end portion of the tubular delivery and dispensing line causes the elastic end portion of the pesticide delivery and dispensing line to resume its original outside diameter on either side of the hole to lock the new coupling portion in place. The damaged coupling portion of the tubular delivery and dispensing line is cut off.

Preferably, the plate, with the end portions of the tubular delivery and dispensing lines, is housed within a service box adapted to be mounted on the exterior wall of a building or some other convenient location for servicing by a technician.

DESCRIPTION OF THE PREFERRED EMBODIMENTS

Figure 1:
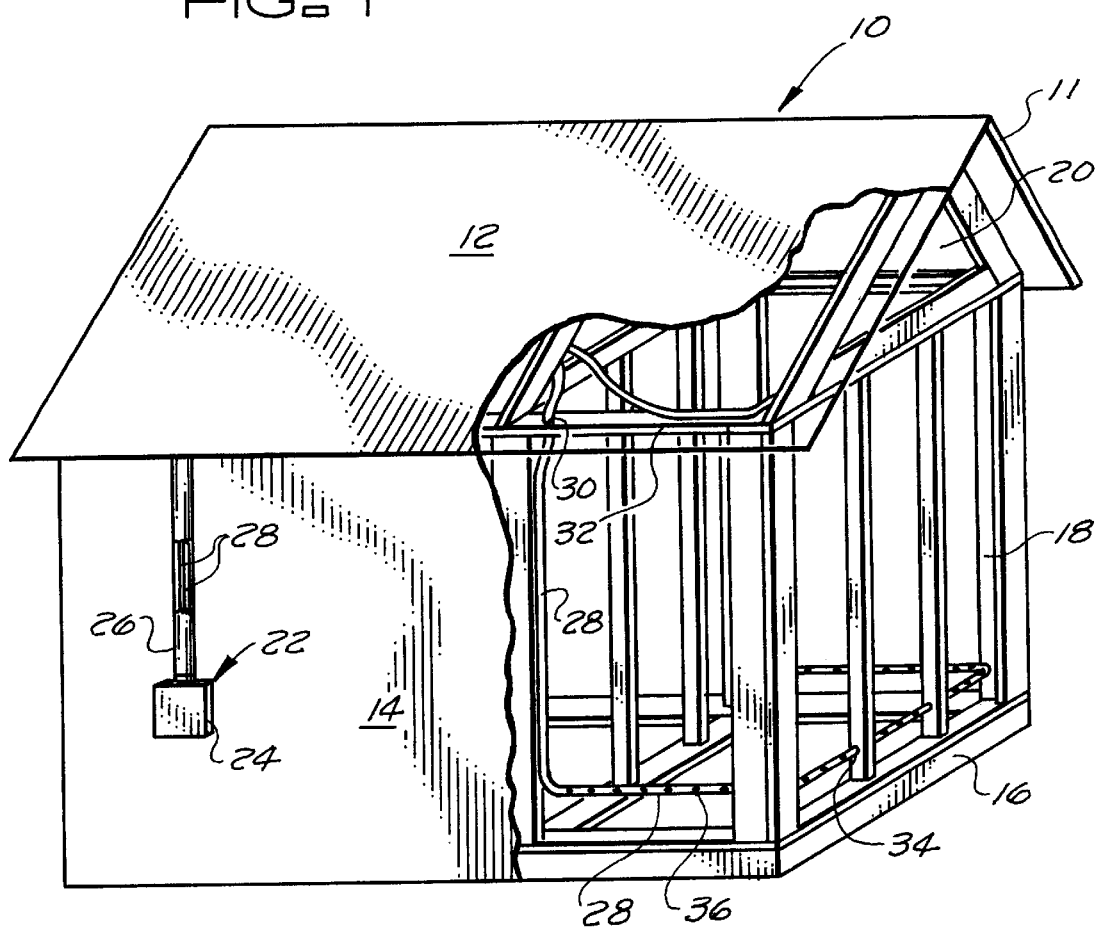
FIG. 1 is a cutaway perspective view of a framed building equipped with an embodiment of the gas or liquid pesticide delivery and dispensing system of the present invention.

FIG. 1 of the drawings shows a building 10 provided with a pesticide delivery and dispensing system of the present invention. A portion of the roof 12 and the exterior sidewalls 14 of the building 10 are cut away to expose part of a foundation slab 16, studs 18 behind the exterior walls 14, and part of an attic 20. A service box 22 with a cover or lid 24 is mounted on one of the exterior sidewalls 14 of the building. A pipe 26 extends from the top of the service box 22, up the sidewall 14 and into the attic 20. The pipe 26 houses a plurality of flexible, tubular pesticide delivery and dispensing lines 28 that pass from the service box 22 through the pipe 26 into the attic 20 of the building. The pesticide delivery and dispensing lines 28 then pass through the attic 20 along the perimeter of the building and down through apertures in the headers of the exterior sidewalls, such as aperture 30 in the header 32, and into the spaces between the studs 18. The pesticide delivery and dispensing lines 28 have solid tubular walls from the service box 22 until the pesticide delivery and dispensing lines 28 reach the various pesticide dispensing zones in the building, such as the horizontal runs in the lower portions of the exterior walls where one of the lines 28 passes through apertures 34 in the studs 18. In these pesticide dispensing zones the tubular walls of the pesticide delivery and dispensing lines 28 have holes 36 therein through which the liquid or gaseous pesticide is dispensed into the zones and the ends of the pesticide delivery and dispensing lines 28 are normally dosed.

As mentioned above, the pesticide delivery and dispensing system of the present invention includes a plurality of flexible tubular pesticide delivery lines 28 which deliver liquid and/or gaseous pesticides to numerous pesticide dispensing zones throughout a building structure and dispense the pesticide in the zones to control and exterminate pests, such as roaches, ants, termites and similar pests. The number of pesticide delivery and dispensing lines and pesticide dispensing zones may vary according to the size of the building, the number of potential openings through which pests might enter, the number of spaces where pests might live and breed, etc. In addition, while FIG. 1 is an example of one pesticide delivery and dispensing system for a building, the pesticide delivery and dispensing system of the present invention may also be used to dispense gaseous or liquid pesticides throughout other areas of a building structure, such as but not limited to the foundations, attics, and crawl spaces of a building structure.

Preferably, the flexible tubular pesticide delivery and dispensing lines 28 are made of a polymeric material, such as but not limited to polyethylene. The pesticide delivery and dispensing lines 28 may each be made in one continuous length or may each be made up of tubular sections joined by conventional tubular couplings. While the entire lengths of the tubular pesticide delivery and dispensing lines 28 may be elastic, at least the end portions 38 of the tubular pesticide delivery and dispensing lines 28 housed in the service box 22 are elastic. Due to the elasticity of the end portions 38 of the tubular pesticide delivery and dispensing lines 28, the elastic end portions 38 can be placed under compressive stress to deform the elastic end portions and reduce the outside diameter of the elastic end portions and/or the elastic end portions 38 can be stretched or elongated by placing the elastic end portions under tensile stress (tension) to deform the elastic end portions and reduce the outside diameters of the end portions. When the compressive and/or tensile stress or stresses are released, the elasticity of the elastic end portions 38 causes the elastic end portions to return to their initial state or form and initial outside diameter.

Figure 2:
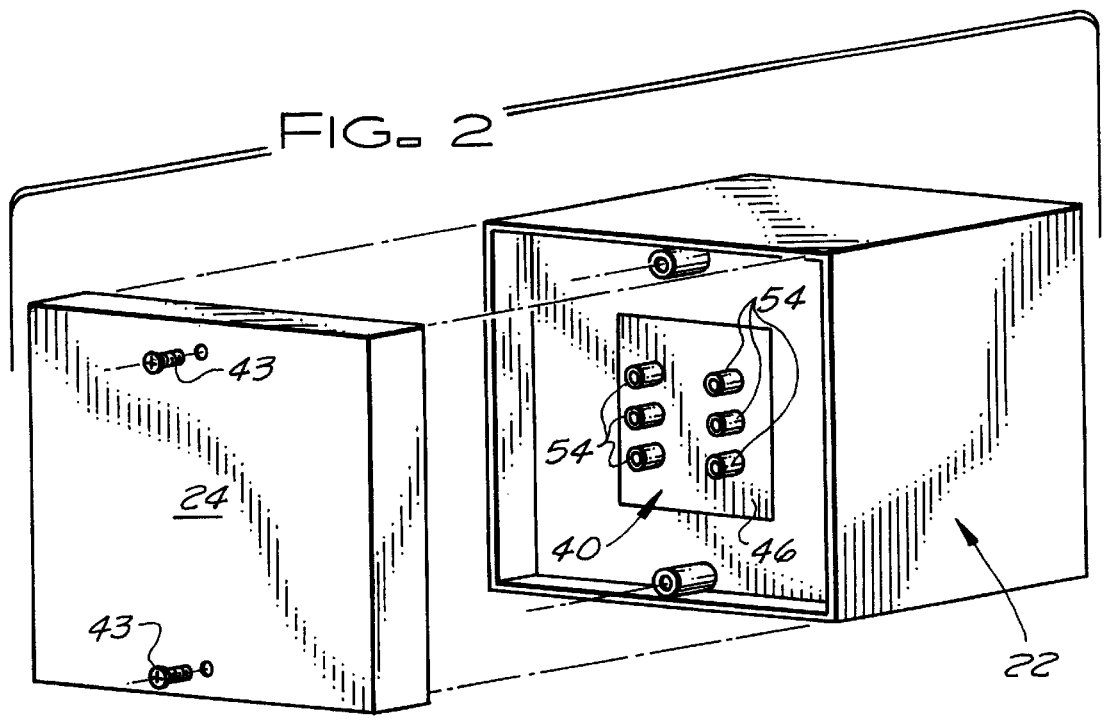
FIG. 2 is a perspective view of a service box of the present invention with the box cover removed.
Figure 3:
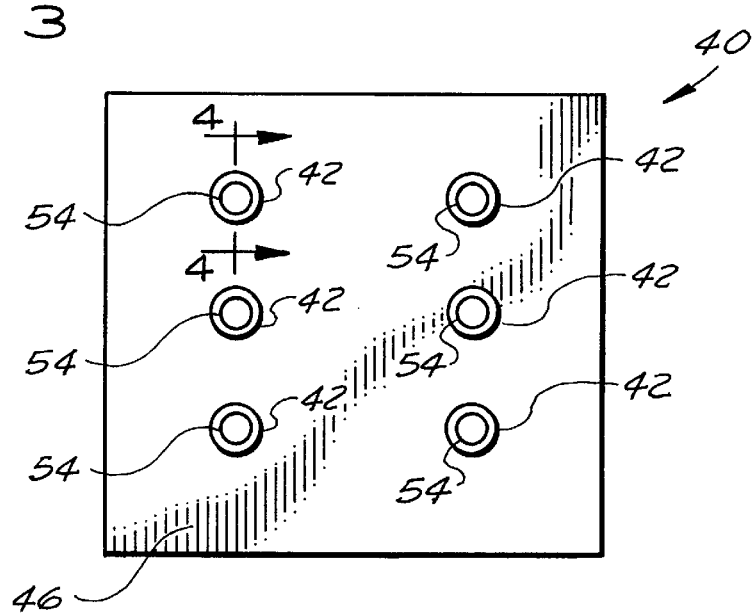
FIG. 3 is front view of the service box plate of the present invention and the open-ended couplings of the elastic end portions of the tubular delivery and dispensing lines mounted in the service box plate.
Figure 4:
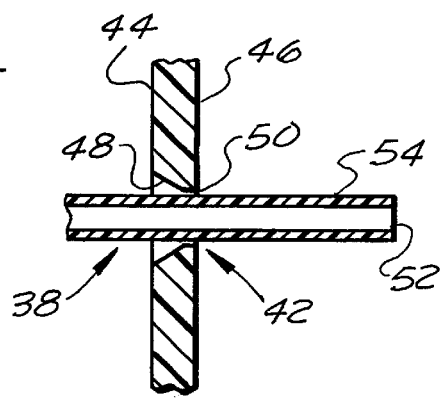
FIG. 4 is a partial transverse cross section through the service box plate and a stretched elastic end portion of a tubular delivery and dispensing line passing through a hole in the plate, taken substantially along lines 4—4 of FIG. 3.
Figure 5:
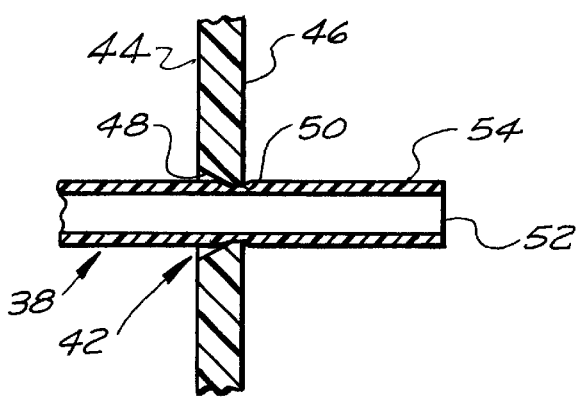
FIG. 5 is a partial transverse cross section through the service plate and an unstretched end portion of a tubular delivery and dispensing line passing through a hole in the plate, taken substantially along lines 4—4 of FIG. 3.

As shown in FIGS. 2 to 4, the service box 22 includes the cover or lid 24 which may be secured to the service box by screws 43, by a snap fit, hinges, or other convention fasteners that permit ready access to the open ends of the tubular delivery and dispensing lines within the box and a plate 40 with holes 42 passing from a first major surface 44 to a second major surface 46 of the plate. While the plate 40 may be made of other materials, preferably, the plate is made of a polymeric material, such as but not limited to a polyvinyl chloride. The service box plate 40 may be adhesively bonded, snap fit, hinged or otherwise secured (preferably, removably secured) to the service plate box to permit access to the backside of the plate 40 after the service box has been mounted on an exterior wall of a building or other location.

Each of the holes 42 has a conical frustum shaped portion 48, extending from the first major surface 44 toward the second major surface 46 of the plate 40, which merges with an annular edge portion 50 of the hole that grips the end portion 38 of the tubular pesticide delivery and dispensing line 28 passing through the hole. The conical frustum shaped portion 48 of each of the holes 42 has an internal diameter, adjacent the first major surface 44 of the plate 40, which is greater than the outside diameter of the elastic end portion 38 of tubular pesticide delivery and dispensing line 28 passing through the hole when the line 28 is unstressed and decreases in internal diameter in the direction of the second major surface until it merges with the annular edge portion 50 of the hole. The annular edge portion 50 of each of the holes 42 has the smallest diameter of the hole and preferably, has a width of about one sixteen of an inch so that it does not unduly cut into the outer surface of a line passing through the hole. When the elastic end portion 38 of the tubular pesticide delivery and dispensing line 28 passing through one of the holes 42 is in an unstressed state, the internal diameter of the annular edge portion 50 of the hole 42 is less than the outside diameter of the elastic end portion 38 of the tubular pesticide delivery and dispensing line 28 passing through the hole. With this structure, the annular edge portion 50 of each of the holes 42 grips the outer surface of the elastic end portion 38 of the tubular pesticide delivery and dispensing line 28 passing through the hole 42 and locks or retains the tubular pesticide delivery and dispensing line 28 in place. This permits pesticide to be introduced into the tubular pesticide delivery line 28 through an open end 52 of the elastic end portion 38 of the tubular pesticide delivery and dispensing line.

Preferably, the elastic end portions 38 of each of the flexible tubular pesticide delivery and dispensing lines 28, extend beyond the second major surface 46 of the plate 40 as shown in FIGS. 2 to 5 to form a coupling 54 for receiving the conical end of a nozzle that supplies a liquid or gaseous pesticide to the line. By inserting the end portions 38 of the long flexible tubular pesticide delivery and dispensing lines 28 through the holes 42 from the first major surface 44 to the second major surface 46, the conical frustum shaped portion 48 of each of the holes guides and aligns the open end 52 of the tubular pesticide delivery and dispensing line being forced or passed through the hole with the annular edge portion 50 of the hole to facilitate its initial passage through the annular edge portion of the hole. Due to the elasticity of the end portion 38, the elastic end portion 38 can be deformed and reduced in diameter by compressive stresses exerted on the outer surface of the elastic end portion by the annular edge portion 50 of the hole 42 to permit the elastic end portion to be passed through the hole. The conical frustum shaped portion 48 of the hole 42 facilitates the deformation and reduction in outside diameter of the elastic end portion 38 as the elastic end portion is passed through the hole. In addition or as an alternative, the elastic end portion 38 can be placed under tensile stress to deform and stretch or elongate the elastic end portion 38 and reduce the outside diameter of elastic end portion to permit the elastic end portion to be passed through the hole. Once the stresses are released, the elastic end portion 38, on both sides of the annular edge portion 50 of the hole 42 expands to an outside diameter greater than the internal diameter of the annular edge portion of the hole 42 to lock the elastic end portion 38 of the pesticide delivery and dispensing line in place.

In a preferred method of assembling the system, once the elastic end portion 38 of the tubular delivery and dispensing line 28 has been passed through the hole 42 a sufficient distance to permit the elastic end portion 38 to be gripped on the second side of the plate 40, the elastic end portion 38 is gripped and the end portion is placed in tension to stretch the elastic end portion of the tubular delivery and dispensing line 28 and reduce the outside diameter of the elastic end portion 38. Preferably, the elastic end portion 38 is stretched until the outside diameter of the elastic end portion is less than the internal diameter of the annular edge portion 50 of the hole 42. The elastic end portion can then be easily passed through the plate 40 until the elastic end portion extends beyond the second side of the plate a distance suitable for forming the open end coupling 52. Once this distance is reached, the tension on the elastic end portion 38 is released and the elastic end portion returns to its initial unstretched state and outside diameter to be gripped and locked in place by the annular edge portion 50 of the hole 42.

An excess of length of the elastic end portion 38 of each of the tubular delivery and dispensing lines 28 may be coiled or otherwise stored on the first or back side of the plate 40, preferably, within the service box 22, to be available for replacement of any of the couplings 52 that might become damaged in service. By placing the elastic end portion 38 with the damaged coupling 52 in tension and reducing the outside diameter of the end portion 38 relative to the internal diameter of the annular edge portion 50 of the hole, that part of the excess length of the end portion needed to replace the damaged coupling 52 can then be easily and quickly drawn through the hole 42 to replace the damaged coupling, the tension on the elastic end portion can be released to lock the end portion in place, and the damaged coupling can be cut off. The outside diameter of the elastic end portion 38 of the pesticide delivery and dispensing line 28 can also be reduced by the compressive forces placed on the elastic end portion 38 by the conical frustum shaped portion 48 and the annular edge portion 50 of the hole 42 as the elastic end portion is passed through the hole.

Figure 6:
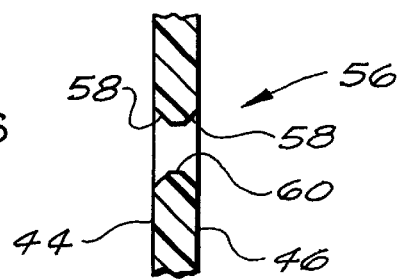
FIG. 6 is a partial transverse cross section through a service box plate of the present invention showing an alternative hole configuration.

FIG. 6 illustrates a second embodiment of the hole configuration for the holes in the service box plate 40. As shown, the hole 56 has two conical frustum shaped portions 58 instead of one conical frustum shaped portion and the annular edge portion 60 is located intermediate, e.g. midway between, the major surfaces 44 and 46 of the plate 40 rather than adjacent the second surface 46. Otherwise, the second embodiment of the hole configuration for the holes in the service box plate 40 is the same as the embodiment of FIGS. 2 to 5.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A pesticide delivery and dispensing system for delivering pesticides to and dispensing pesticides in zones of a building structure, consisting essentially of:

a plurality of flexible, polymeric, tubular delivery and dispensing lines (28) for carrying a pesticide from a service box to zones of a building structure and dispensing the pesticide in the zones to control pests; each of the tubular delivery and dispensing lines (28) having an elastic end portion (38) of a first outside diameter in an unstressed state that is deformable to a second reduced outside diameter under stress and that returns to the first outside diameter when no longer under stress;

a service box (22) with a plate (40) mounted within the service box; the plate (40) having first and second sides with first and second major surfaces (44 and 46) and holes (42, 56) passing from the first major surface (44) to the second major surface (46) of the plate (40); the holes (42, 56) each having a conical frustum shaped portion (48, 58) that extends and diminishes in internal diameter from the first major surface toward the second major surface of the plate and merges with an annular edge portion (50, 60) of the hole (42, 56); the elastic end portions (38) of the tubular delivery and dispensing lines (28) passing through the holes (42, 56) in the plate (40) and projecting beyond the second major surface (48) of the plate (40) to form open end couplings (54) for introducing pesticides into the tubular delivery and dispensing lines (28); the annular edge portion (50, 60) of each of the holes (42, 56) having the smallest internal diameter of the hole (42. 56); and the internal diameter of the annular edge portion (50, 60) of each of the holes (42, 56) being equal to the second reduced outside diameter of the elastic end portion (38) of the tubular delivery and dispensing line (28) passing through the hole (42, 58) whereby the annular edge portion (50, 80) of each of the holes (42, 56) deforms that part of the elastic end portion (38) of the tubular delivery and dispensing line (28) within the annular edge portion (50, 60) of the hole (42, 56) to the second reduced outside diameter while the elastic end portion (38) of the tubular delivery and dispensing line (28) on both sides of the annular edge portion (50, 60) of the hole (42, 56) has an outside diameter equal to the first outside diameter to lock the tubular delivery and dispensing line (28) in place for introducing pesticide into the tubular delivery and dispensing line (28) through the open end coupling (54) of the tubular delivery and dispensing line (28).

2. The pesticide delivery and dispensing system for delivering pesticides to and dispensing pesticides in zones of a building structure according to claim 1, wherein;

each of the elastic end portions (38) of the pesticide delivery and dispensing lines (28) has an excess length on the first side of the plate (40) that can be drawn through the hole (42, 56) in the plate through which the elastic end portion (38) passes by placing the elastic end portion (38) under stress to reduce the outside diameter of the elastic end portion (38) as the elastic end portion passes through the annular edge portion (50, 60) of the hole (42, 56).

3. The pesticide delivery and dispensing system for delivering pesticides to and dispensing pesticides in zones of a building structure according to claim 2, wherein:

the excess lengths of the elastic end portions (38) of the tubular delivery and dispensing lines (28) are housed within the service box (22).

4. The pesticide delivery and dispensing system for delivering pesticides to and dispensing pesticides in zones of a building structure according to claim 2, wherein:

the annular edge portion (50) of each of the holes (42) is adjacent the second major surface (46) of the plate (40).

5. The pesticide delivery and dispensing system for delivering pesticides to and dispensing pesticides in zones of a building structure according to claim 2, wherein:

the annular edge portion (60) of each of the holes (56) is intermediate first and the second major surfaces (44 and 46) of the plate (40).

6. The pesticide delivery and dispensing system for delivering pesticides to and dispensing pesticides in zones of a building structure according to claim 2, wherein: the service box (22) is mounted on an exterior surface of a building so that pesticide can be introduced into the tubular delivery and dispensing lines (28) from outside the building in connection with pest control.

7. The pesticide delivery and dispensing system for delivering pesticides to and dispensing pesticides in zones of a building structure according to claim 1, wherein;

the annular edge portion (50) of each of the holes (42) is adjacent the second major surface (46) of the plate (40).

8. The pesticide delivery and dispensing system for delivering pesticides to and dispensing pesticides in zones of a building structure according to claim 1, wherein:

the annular edge portion (60) of each of the holes (56) is intermediate first and the second major surfaces (44 and 46) of the plate (40).

9. The pesticide delivery and dispensing system for delivering pesticides to and dispensing pesticides in zones of a building structure according to claim 1, wherein:

the service box (22) is mounted on an exterior surface of a building so that pesticide can be introduced into the tubular delivery and dispensing lines (28) from outside the building in connection with pest control.

* * * * *